(12) United States Patent
Damadian

(10) Patent No.: US 6,544,041 B1
(45) Date of Patent: Apr. 8, 2003

(54) SIMULATOR FOR SURGICAL PROCEDURES

(75) Inventor: Raymond V. Damadian, Woodbury, NY (US)

(73) Assignee: Fonar Corporation, Melville, NY (US)

( * ) Notice: Subject to any disclaimer, the term of this patent is extended or adjusted under 35 U.S.C. 154(b) by 0 days.

(21) Appl. No.: 09/680,667

(22) Filed: Oct. 6, 2000

Related U.S. Application Data

(60) Provisional application No. 60/157,916, filed on Oct. 6, 1999.

(51) Int. Cl.$^7$ ................................................. G09B 23/28
(52) U.S. Cl. ...................... 434/262; 434/272; 600/416; 600/424
(58) Field of Search .................. 600/130, 416, 600/424; 434/262, 272

(56) References Cited

U.S. PATENT DOCUMENTS

| | | | |
|---|---|---|---|
| 5,211,165 A | 5/1993 | Dumoulin et al. | 128/653.1 |
| 5,383,454 A | 1/1995 | Bucholz | 128/653.1 |
| 5,517,990 A | 5/1996 | Kalfas et al. | 128/653.1 |
| 5,558,091 A | 9/1996 | Acker et al. | 128/653.1 |
| 5,694,945 A | 12/1997 | Ben-Hami | 128/736 |
| 5,769,640 A * | 6/1998 | Jacobus et al. | 434/262 |
| 5,882,206 A | 3/1999 | Gillio | 434/262 |
| 6,016,439 A * | 1/2000 | Acker | 600/411 |
| 6,062,865 A * | 5/2000 | Bailey | 434/262 |
| 6,081,740 A * | 6/2000 | Gombrich et al. | 600/424 |
| 6,220,866 B1 * | 4/2001 | Amend et al. | 434/266 |
| 6,390,982 B1 * | 5/2002 | Bova et al. | 600/443 |

FOREIGN PATENT DOCUMENTS

GB 2338582 A * 12/1999 ........... G09B/23/30

* cited by examiner

*Primary Examiner*—Marvin M. Lateef
*Assistant Examiner*—Devaang Shah
(74) *Attorney, Agent, or Firm*—Lerner, David, Littenberg, Krumholz & Mentlik, LLP

(57) ABSTRACT

A simulator for use in the training of surgeons is disclosed. The simulator utilizes information defining the position of a surgical tool or probe used by the surgeon trainee relative to a mannequin corresponding to a living mammalian subject such as a human or non-human mammal. The mannequin desirably includes model internal organs within it. The simulator further includes a surgical probe and means for providing position and orientation information defining the position and orientation of the surgical probe relative to the mannequin. A memory device stores image data defining an image representative of internal organs found within the living subject corresponding to the mannequin. The simulator desirably further includes means for providing a composite image including images of internal organs and a representation of the surgical probe based on said image data and said position and orientation data.

18 Claims, 5 Drawing Sheets

SIMULATOR FOR SURGICAL PROCEDURES

CROSS-REFERENCE TO RELATED APPLICATIONS

The present application claims benefit of U.S. Provisional Patent Application No. 60/157,916, filed Oct. 6, 1999 entitled A SIMULATOR FOR MRI-GUIDED SURGERY, the disclosure of which is hereby incorporated by reference herein.

BACKGROUND OF THE INVENTION

The present invention relates to a simulator and simulation method for use in the training of surgeons for image-guided surgical procedures.

In an image-guided surgical procedure, the surgeon manipulates a surgical probe such as a catheter, trocar, endoscope or other instrument within the body of a living subject such as a human or other mammal while the subject is being imaged using a modality such as magnetic resonance imaging ("MRI"), fluoroscopic imaging or computerized axial tomography ("CAT"). Image-guided surgery can be performed as a minimally-invasive procedure, in which some or all of the probe typically is hidden within the body, so that the surgeon cannot see the operative portion of the probe directly. The imaging device displays a representation of the probe in conjunction with the image of the subject's body, so that the surgeon can determine the position and orientation of the probe relative to the internal organs of the subject by observing the image. In some cases, the representation of the probe is created by the imaging instrument in the course of imaging the subject. For example, where a radioopaque probe is used in conjunction with fluoroscopic imaging, the probe will appear as a part of the image. In other cases, the position and orientation of the probe relative to the imagining instrument is monitored by a separate monitoring system, and a computer-synthesized representation of the probe is combined with the image data to form a composite image having the representation of the probe in the correct position and orientation. For example, Dumoulin et al., U.S. Pat. No. 5,211,165 discloses a system in which the position of a probe is monitored by an radiofrequency ("RF") tracking system while an image of the subject is acquired by MRI, and a representation of the probe is superimposed on the MRI image.

Presently, the training of surgeons for surgical procedures takes many forms including the use of cadavers and mannequins. Training exercises using a cadaver or a mannequin by itself do not provide realistic training for the surgeon so as to help him or her visualize the position of a probe in the patient based on the images displayed by an imaging system. It is normally impractical to conduct cadaver or mannequin training using the real imaging system which will be used in actual surgery, due to considerations such as the cost and limited availability of the real imaging system. Although computer simulations have been proposed, these typically do not provide the physical sensations associated with actual manipulation of a surgical probe.

Thus, there have been needs for improved simulation apparatus and simulation methods.

SUMMARY OF THE INVENTION

One aspect of the present invention relates to a simulator for use in the training of surgeons. The simulator utilizes information defining the position of a surgical tool or probe used by the surgeon trainee relative to a mannequin.

A simulator according to this aspect of the invention desirably includes a mannequin corresponding to a living mammalian subject such as a human or non-human mammal. The mannequin desirably includes model internal organs within it. The simulator also includes a surgical probe and means for providing position and orientation information defining the position and orientation of the surgical probe relative to the mannequin. A memory device stores image data defining an image representative of internal organs found within the living subject corresponding to the mannequin. The simulator desirably further includes means for providing a composite image including images of internal organs and a representation of the surgical probe based on said image data and said position and orientation data. The composite image providing means desirably is arranged so that in the composite image, the position and orientation of the representation of the probe relative to the images of the internal organs correspond to the position and orientation of the probe relative to the internal organs of the mammalian subject which would be observed in a real image of the mammalian subject with the surgical probe at a position and orientation relative to the living subject corresponding to the position and orientation of the probe relative to the mannequin.

Further aspects of the invention provide methods of simulating an image-guided surgical procedure using a mannequin and a composite image as discussed above in connection with the simulator.

The simulator provides a realistic training experience. As the trainee surgeon manipulates the probe, he or she sees the representation of the probe move on the displayed composite image in the same manner as he would see the representation of a probe move on the image in a real image-guided surgical procedure. At the same time, the trainee receives the physical, tactile experience associated with moving the probe through the spaces defined by the internal organs.

The probe position and determining means use of a series of light beams placed inside the mannequin in a gridlike pattern. Alternatively, magnetic, electromagnetic and optical position determining systems may be employed.

DETAILED DESCRIPTION OF THE PREFERRED EMBODIMENTS

Figure 1A:
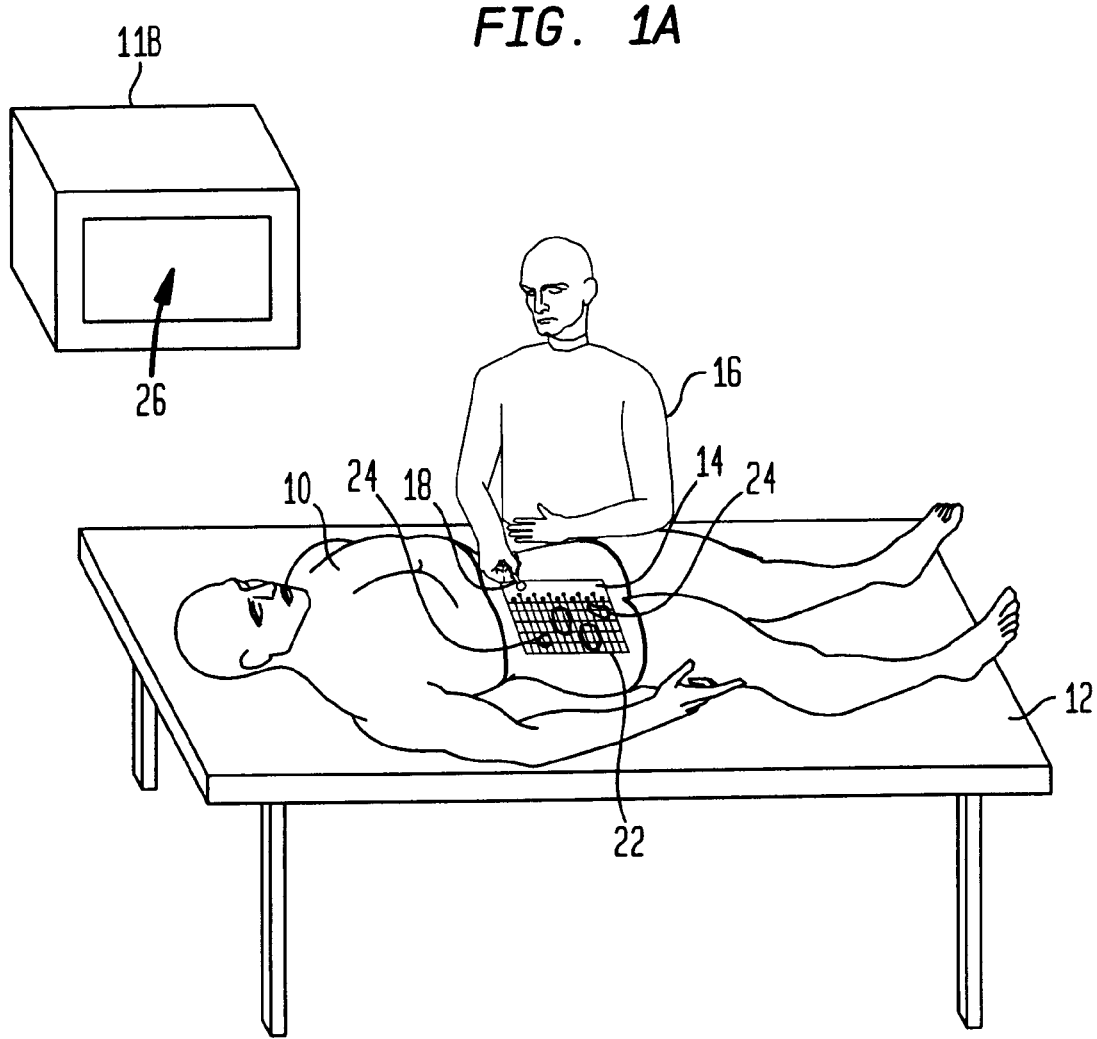
FIG. 1A is a diagrammatic, perspective view of the simulator according to one embodiment of the invention.

Referring to FIG. 1A, a mannequin 10 according to one embodiment of the invention is provided on a surgery table 12. The mannequin is shown in cutaway in FIG. 1 to reveal its interior 14. In actual practice, the mannequin desirably is closed except for a small opening through which the trainee 16 can insert the probe in the same manner as the surgeon would insert the probe in an incision or natural body orifice during a real surgical procedure. The surgery table 12 is positioned such that the mannequin 10 is easily accessible for a surgeon trainee 16. The trainee 16 practices surgical procedures on the mannequin 10 using a surgical tool or probe 18.

The interior 14 of the mannequin 10 contains a means to determine the position of the probe 18. FIG. 1A illustrates one embodiment of the invention where the means provides a series of light beams 22 forming a grid pattern. The beams 22 are densely packed and placed along all three orthogonal directions. The interior further comprises model organs 24. The model organs are disposed in an arrangement within the interior of the mannequin corresponding to the arrangement of internal organs within the torso of a human body. The model organs may be entirely transparent to the light in beams 22, or may have transparent regions or holes (not shown) disposed in alignment with the grid pattern so that the light beams can pass through the internal organs.

Figure 1B:
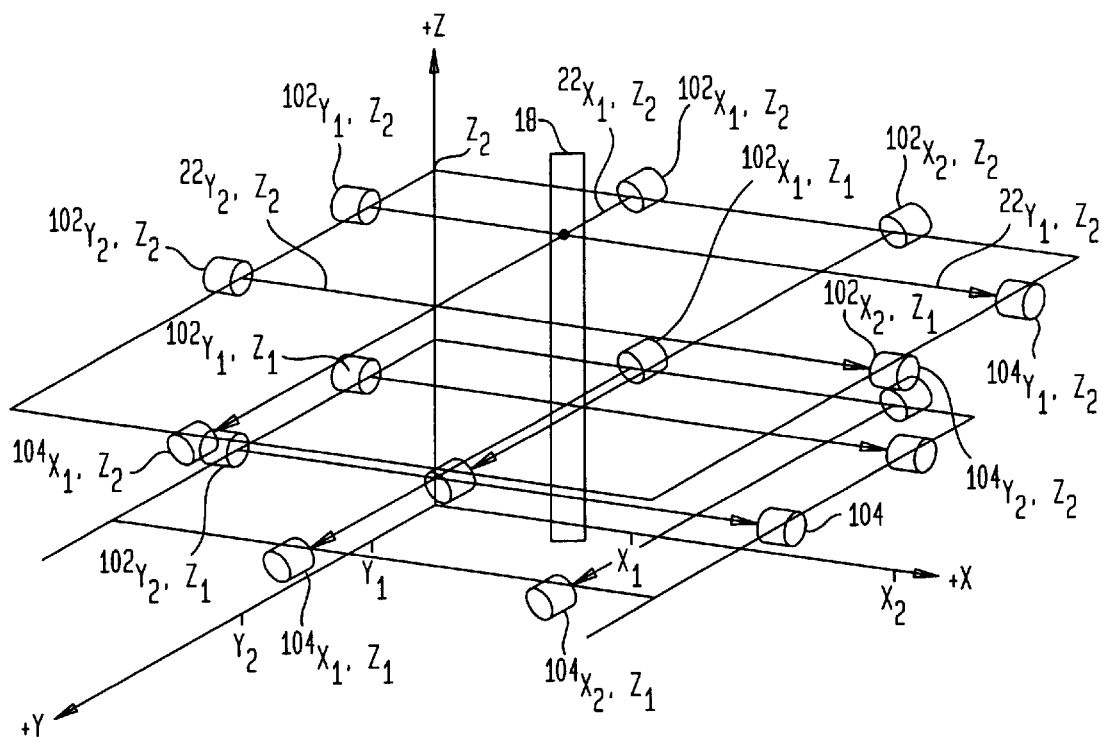
FIG. 1B is a diagrammatic perspective view depicting certain portions of the simulator of FIG. 1A.

As seen in FIG. 1B, the locating means includes a large number of light sources 102 mounted to the mannequin along two orthogonal planes. For example, source $102_{y2,z2}$ is disposed at coordinates y2, z2 and is arranged to emit a beam of light $22_{y2,z2}$ directed in the X direction, whereas source $102_{x1,z2}$ is disposed at coordinates x1,z2 and arranged to emit a beam of light $22_{x1,z2}$ directed in the Y direction, and so on. The locating apparatus further includes a plurality of photodetectors 104, each such photodetector being associated with one light source and arranged to receive the beam emitted by that source. For example, photodector $104_{y2,z2}$ is aligned with source $102_{y2,z2}$ and receives beam $22_{y2,z2}$. Sources 102 may be individual light-emitting elements such as individual semiconductor lasers, light emitting diodes or lamps. Alternatively, sources 102 may be provided be the ends of individual optical fiber strands all connected to a common light emitting element. Any other device or assembly capable of forming the light beams 22 in the desired arrangement can be used. The sources may include conventional optical elements such as lenses, filters and collimators (not shown) for forming the individual beams. Photodetectors 102 may be conventional photodiodes or other optoelectronic devices. Only a few sources and photodetectors are depicted in FIG. 1B for clarity of illustration; in actual practice, tens or hundreds of sources would be used.

Each photodetector 104 is connected to a threshold detection circuit 106 (FIG. 1C), so that the photodetector provides an electrical signal representing light impinging on the photodetector to the associated threshold detection circuit. Each threshold detection circuit determines whether the electrical signal from the associated photodetector indicates illumination above or below a predetermined threshold. If the signal indicates illumination below the threshold, the threshold detection circuit provides a first signal indicating that the beam 22 associated with the photodetector has been interrupted. If the signal from the photodetector indicates illumination above a preselected threshold, the threshold circuit 106 provides a second signal indicating that the light beam 22 associated with that photodetector has not been interrupted.

Figure 1C:
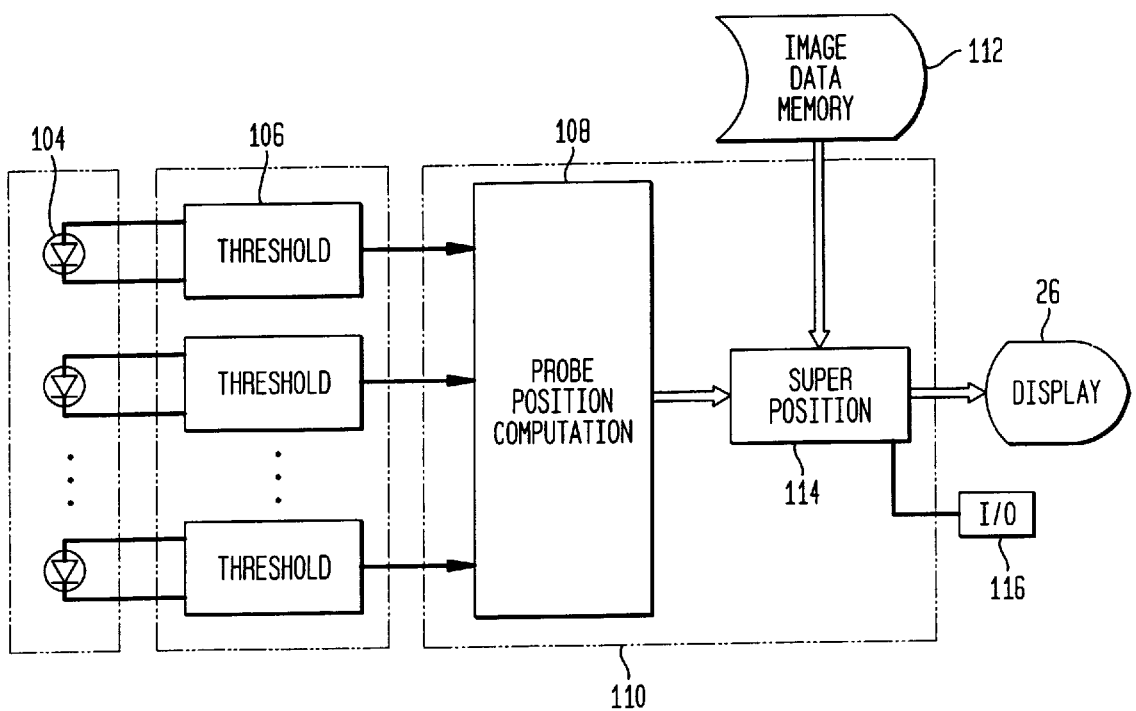
FIG. 1C is a functional block diagram depicting certain portions of the simulator of FIGS. 1A–1B.

As shown in FIG. 1C, the signals from threshold circuits 106 are passed to a probe position computation unit 108. The probe position computation unit may be a portion of a conventional general-purpose computer 110. The computer is programmed to examine the signals from the threshold detection circuits and determine the position of probe 18. For example, the computer may first examine the signals associated with all of the light beams extending in the X direction at Z coordinate $Z_2$. In the simplified depiction of FIG. 1B, the computer examines the signals from the threshold detectors associated with photodetectors $104_{y1,z2}$ and $104_{y2,z2}$. If the first signal, indicating beam occlusion, the computer records the Y coordinate of the associated beam as the Y coordinate of the probe at Z coordinate $Z_2$. In FIG. 1B, the probe 18 is occluding beam $22_{y1,z2}$ and hence the computer would record coordinate y1. The computer then examines the signals associated with the light beams extending in the Y direction at coordinate Z2. Because probe 18 is occluding beam $22_{x1,z2}$, the computer will record coordinate $x_1$ as the x coordinate of the probe at Z coordinate $Z_2$. Thus, the computer acquires coordinate x1,y1,z2 as a location where probe 18 is present. In like manner, the computer acquires other coordinates where the probe is present. This set of coordinates defines a line or curve in the X,Y,Z coordinates system defining a frame of reference fixed to the mannequin. The probe position and computation unit may add additional points to such line or curve by interpolation.

The apparatus further includes a conventional computer memory 112 such as magnetic or optical disk memory, semiconductor memory or the like holding a set of image data defining an image representative of internal organs found within the living subject corresponding to the mannequin. That is, the image data defines an image which would be seen in the imaging modality simulated by the system if a real person with organs of the same size and shape as the model organs were imaged. For example, if the system is intended to simulate an MRI system, the image data defines an MRI image of a real person having internal organs of the same size and shape as the model organs. This correspondence can be achieved by first imaging a real, living subject to provide the image data and building the mannequin based on the image data. Thus, the model organs can be designed and/or fabricated using a three dimensional solid modeling, computer-controlled machining or computer assisted drafting program based on the shapes defined in the image data. Alternatively, the mannequin can be fabricated to provide the desired internal structure and the sizes and shapes of internal organs can be provided either by actually imaging the mannequin or by providing computer data representing the sizes and shapes of the organs manually or from the computer system used to fabricate the mannequin. In this case MRI contrast data taken from real images for particular tissues types is combined with the sizes and shapes of the synthetic organs. For example, the volume occupied by bone marrow can be "filled in" with MRI contrast data representing real bone marrow in a particular type of image. Stated another way, the image data corresponds to the data which would be included in an image of the mannequin if the mannequin were composed of living tissue and if the mannequin were imaged. Regardless of how it is derived, the image data is effectively in the same frame of reference as the mannequin.

The apparatus further includes an image superposition unit 114, which may be part of the same conventional general-purpose computer 110 as used in the location-determining unit 108. The image superposition unit 114 is linked to input devices 116. These input devices allow the trainee to supply information specifying a particular imaging plane. These input devices may simulate the controls of a real MRI imaging apparatus. The image superposition unit is also linked to a video display 118, which desirably is identical to the display incorporated in a real MRI imaging system. The image superposition unit 114 retrieves image data from memory 116 and combines the data representing the locations of the probe 18 derived by position computation unit 108 with the image data so as to superimpose a representation of the probe on the pictorial image and thereby provide a data defining composite image. Because the image data is effectively image data in the frame of reference of the mannequin, and because the probe location data is in the same frame of reference, the superposition can be accomplished readily. Typically, the image data includes different luminance, gray scale values or color values for different pixels, each such luminance, gray shade or color being associated with tissue having a given MRI response, so that the pictorial representation shows different shades and/or different colors for different types of tissue. A unique color and/or shade are used to represent the probe. For example, a bright orange color may be used to represent the probe. Values defining bright orange are substituted for the image data at each point in the X,Y,Z coordinate system occupied by the probe.

Figure 2:
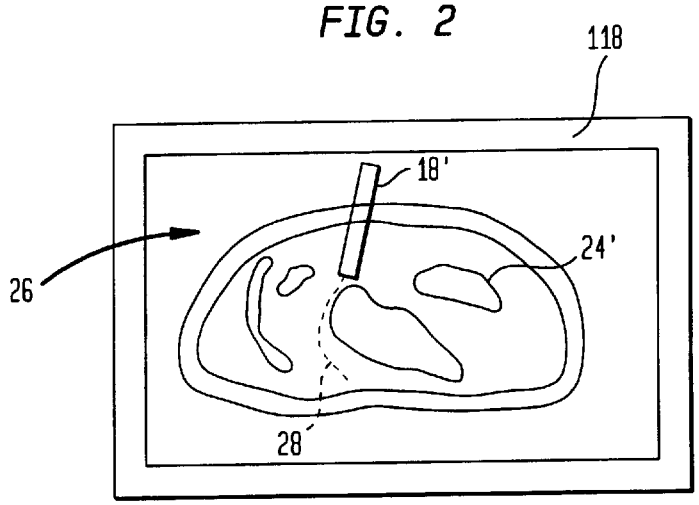
FIG. 2 is a diagrammatic depictions of images acquired by the simulator of FIGS. 1A–1C.

The resulting composite image data produces a pictorial composite image 26 on the display 118 based on the image data (FIG. 2). In the composite pictorial image, the position and orientation of the representation 18' of the probe relative to the images 24' of the internal organs corresponds to the position and orientation of the probe relative to the internal organs of a live subject which would be observed in a real image of the live subject with the surgical probe at a position and orientation relative to the living subject corresponding to the position and orientation of the probe relative to the mannequin. Thus, the trainee surgeon effectively "sees" the same image as he would see in a real MRI-guided surgical procedure with a real subject. The trainee 16 can use the imaging to visualize in real-time the path 28 of the surgical probe on an anatomically relevant MR image, and obtain visual and tactile feedback as he advances the probe along the path. The image feedback permits the trainee to correct or adjust the path of the probe as part of the training exercise. The trainee surgeon can use input device 116 to select a pictorial image in any desired plane for viewing, in the same way as in a real MRI guided surgical procedure with a real MRI instrument. The trainee surgeon also has the physical experience of manipulating the surgical probe at the same time as he observes the image, and seeing how the image changes with such manipulation. This provides a realistic training environment, without the use of a real MRI instrument.

The light-beam apparatus for providing position information defining the position of the surgical probe relative to the mannequin can be varied. For example, although individual threshold circuits 106 associated with individual photodetectors 104 are discussed above for ease of understanding, these individual circuits can be replaced by a single threshold detector which samples signals from the individual photodetectors at different times, so that these signals are effectively time-division multiplexed. In this arrangement, the individual light sources can be illuminated in a matching sequence, so that each light beam is present only when the signal from the associated photodetector is sampled. The individual light sources can be replaced by a beam-scanning arrangement such as a moving mirror or lens to provide light beams at the proper locations in the desired sequence. In a further variant, the individual photodetectors can be replaced by a composite detector such as a charge coupled device (CCD) or other solid-state imaging chip, or by a scanning detector such as an image orthicon tube, commonly referred to as a video camera tube.

Figure 3:
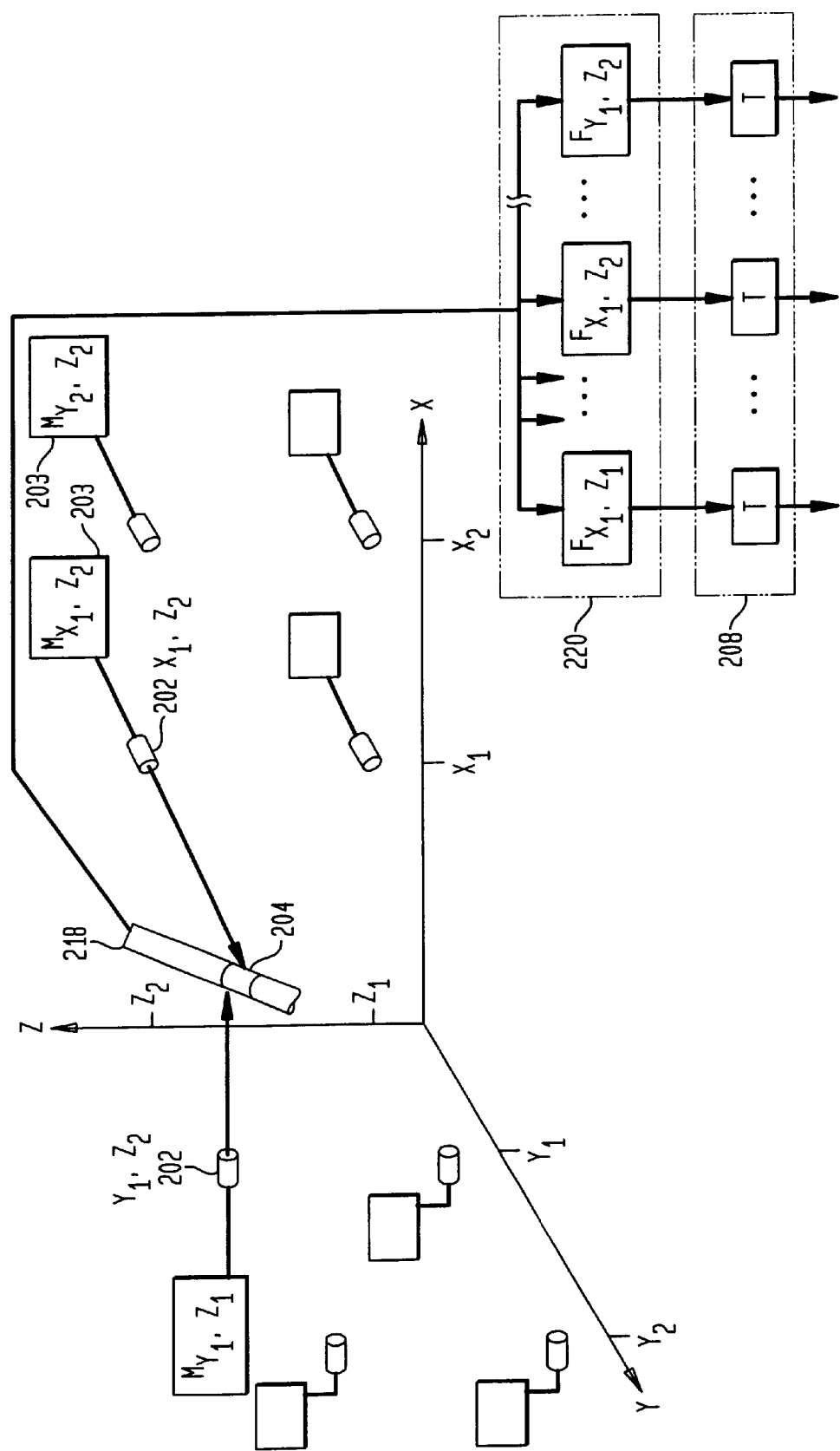
FIG. 3 is a view similar to FIG. 1B but depicting another embodiment of the invention.

In a further variant, the light sources 202 (FIG. 3) may be linked to modulators 203 so that each light source is driven with a signal bearing a different modulation as, for example, modulation at a different frequency, different phase or different encoding, and thus each light beam bears a different modulation. One or more photodetectors 204 are carried on probe 218. The signal from each such probe-carried photodetector 204 is connected to a set of modulation-sensitive filters 220, each such filter being arranged to pass only the signal component corresponding to one of the different modulations. Thus, the output from each filter represents the light, if any, impinging on the photodetector from a particular light beam. For example, in FIG. 3 probe-mounted photodetector 202 is disposed at coordinates x1,y1,z2, and thus intercepts beams $222_{y1,z2}$ and $222_{x1,z2}$ from sources $202_{y1,z2}$ and $202_{x1,z2}$. Accordingly, the signal from detector 202 will be passed by one detector 220 having filter characteristic $F_{y1,z2}$ and by another detector having characteristic $F_{x1,z2}$. The outputs from the filters are connected to threshold detectors 208 similar to the threshold detectors discussed above with reference to FIG. 1B. Only those threshold detectors associated with beams $222_{y1,z2}$ and $222_{x1,z2}$ will provide the first signal, indicating that the probe is at coordinates x1,y1,z2. Additional probe-carried photodetectors can be used in the same way to provide locations of numerous points on the probe.

Figure 4:
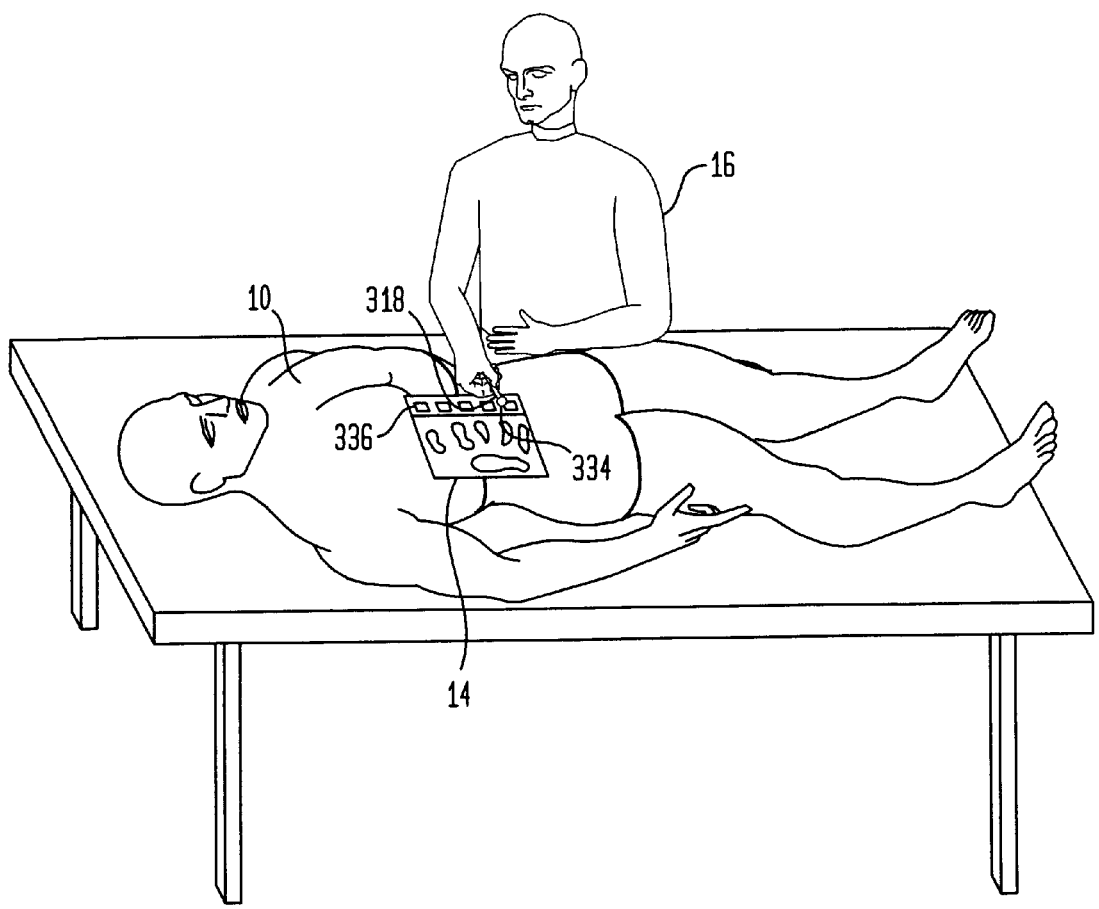
FIG. 4 is a view similar to FIG. 1A but depicting a simulator in accordance with yet another embodiment of the invention.

Other means for providing position information defining the position of the surgical probe relative to the mannequin can be employed. For example, magnetic and electromagnetic position-determining systems, including RF systems, are well-known in the art for use with live patients and can be employed in the present invention. Referring to FIG. 4, these systems use magnetic or electromagnetic field transducers such as a coil or set of coils or one or more hall effect or magnetoresistive devices 334 mounted on the probe 318, and use other field transducers, typically coils 336, mounted on or adjacent to the mannequin 310 in a locating frame of reference. The position and/or orientation of the probe can be determined by monitoring one or more fields transmitted between the field transducer on the probe and the field transducers in the locating frame of reference. Systems of this general type for use with living patients are described, for example, in U.S. Pat. Nos. 5,558,091; 5,694,945 and 5,437,277. Still other systems employ ultrasonic transducers mounted on a handle of a probe and corresponding ultrasonic receivers or transmitters mounted in a fixed frame of reference. These systems are described in U.S. Pat. Nos. 5,517,990 and 5,383,454. The disclosures of the aforementioned patents are incorporated by reference herein.

In a further variant, the probe position and orientation can be detected by a mechanical sterotactic linkage having a reference link mounted in known position relative to the mannequin and a series of links connected between the reference link and a final link fixed to the probe. The various links are movable relative to one another to allow movement of the probe. Transducers such as potentiometers or optical encoders are connected between each pair of adjacent links to monitor the position of each link relative to the adjacent link. In the conventional manner, the position of the probe relative to the mannequin can be calculated from he signals provided by these transducers.

In further variants, the system can be modified to allow movement of the mannequin relative to the supporting table. A position monitoring system continually reports the position and orientation of the mannequin relative to the table, so that the position and orientation of the mannequin are known in the table frame of reference. The stored image data is transformed accordingly, so that the pictorial image moves as the mannequin moves. The position and orientation of the probe may be acquired in the frame of reference of the mannequin as described above, and transformed along with the stored image data. Alternatively, the position and orientation of the probe may be acquired in the table frame of reference and combined with the image data after the image data has been transformed into the table frame of reference.

Although each of the exemplary embodiments of the invention utilizes magnetic resonance imaging, the same techniques can be used with other imaging modalities as, for example, computerized thermographic x-ray imaging, positron emission tomography (PET), radio isotope audioradiographic imaging or any other imaging technology.

As these and other variations and combinations of the features discussed above can be utilized without departing from the present invention as defined by the claims, the foregoing description of the preferred embodiments should be taken by way of illustration rather than by way of limitation of the invention as defined in the claims.

What is claimed is:

1. A simulator for simulating a surgical procedure comprising:
   a mannequin corresponding to a living mammalian subject, said mannequin having an interior;
   a surgical probe;
   means for providing position and orientation information defining the position and orientation of a surgical probe relative to the mannequin;
   a memory device having stored therein image data defining an image representative of internal organs found within the living subject corresponding to the mannequin; and
   means for providing a composite image including images of internal organs and a representation of the surgical probe based on said image data and said position and orientation data so that in said composite image, the position and orientation of the representation of the probe relative to the images of the internal organs corresponds to the position and orientation of the probe relative to the internal organs of the living subject which would be observed in a real image of the living subject with the surgical probe at a position and orientation relative to the living subject corresponding to the position and orientation of the probe relative to the mannequin.

2. The simulator as claimed in claim 1 wherein said mannequin includes model organs disposed on the interior of the mannequin to replicate the anatomy of the mammalian subject.

3. The simulator as claimed in claim 2 wherein said image data stored in said memory is data derived from an image of the mannequin.

4. The simulator as claimed in claim 2 wherein said image data stored in said memory is data derived from an image of the living subject.

5. The simulator as claimed in claim 1 wherein the means for providing position and orientation information comprises one or more light sources for producing a plurality of light beams in the interior of the mannequin so that said light beams form a gridlike pattern and one or more photodetectors adapted to detect said light beams and provide one or more photodetector signals responsive to the detected light beams, and means for determining which of the light beams have been intercepted by the probe based on said one or more photodetector signals.

6. The simulator as claimed in claim 5 wherein said one or more photodetectors include at least one probe-carried photodetector mounted on said probe, said one or more light sources being arranged to modulate each of the light beams with a preselected modulation so that different ones of said light beams carry different modulations, and said means for determining which of the light beams has been intercepted by the probe includes means for detecting the modulation of the photodetector signals from said probe-carried photodetectors.

7. The simulator as claimed in claim 5 wherein said one or more photodetectors include one or more mannequin-carried photodetectors mounted on said mannequin.

8. The simulator as claimed in claim 7 wherein said one or more mannequin-carried photodetectors include a plurality of mannequin-carried photodetectors, each positioned to receive a different one of said light beams so that each of said; mannequin-carried photodetectors produces a photodetector signal representing a particular one of said light beams, and said means for determining which of the beams have been intercepted includes means for determining which of the photodetector signals from said mannequin-carried photodetectors has amplitude lower than a preselected threshold.

9. The simulator as claimed in claim 1 wherein the means for providing position and orientation information comprises at least one probe-carried magnetic field transducer mounted on the probe and at least one fixed magnetic field transducer mounted in fixed disposition relative to the mannequin and means for monitoring one or more fields transmitted between the field transducer on the probe and the field transducer in the interior of the mannequin.

10. A method for simulating surgical procedures comprising:
    providing a mannequin corresponding to a living subject and a surgical probe;
    providing image data defining an image representative of internal organs found within the living subject corresponding to the mannequin;
    inserting a surgical probe into the mannequin;
    acquiring position and orientation information defining the position and orientation of the surgical probe with respect to the mannequin; and
    providing a composite image including images of internal organs and a representation of the surgical probe based on said image data and said position and orientation data so that in said composite image, the position and orientation of the representation of the probe relative to the images of the internal organs corresponds to the position and orientation of the probe relative to the internal organs of the living subject which would be observed in a real image of the living subject with the surgical probe at a position and orientation relative to the living subject corresponding to the position and orientation of the probe relative to the mannequin.

11. A method as claimed in claim 10 wherein said mannequin includes model organs disposed on the interior of the mannequin to replicate the anatomy of the living subject.

12. The method as claimed in claim 11 wherein the step of acquiring position and orientation information includes directing a plurality of light beams within the mannequin in a gridlike pattern; and determining which light beams are intercepted by the surgical probe.

13. The method as claimed in claim 12 wherein the step of arranging a plurality of laser beams includes modulating different ones of the light beams with a different modulation frequency; and the step of determining which laser beams are intercepted includes monitoring the output of a photocell mounted on the surgical probe for a component varying with the preselected modulation associated with each light beam.

14. The method as claimed in claim 11 wherein the step of providing said image data comprises acquiring an image of the mannequin including said model organs.

15. The method as claimed in claim 11 where the step of providing an image of the mannequin comprises acquiring an actual image of the living subject corresponding to the mannequin and wherein said step of providing a mannequin includes providing said model organs on the interior of the mannequin so that the model organs are of the size and shape depicted in the actual image.

16. A simulator for simulating a surgical procedure, comprising a mannequin corresponding to a living mammalian subject, said mannequin having an interior;

means for providing position and orientation information defining the position and orientation of a surgical probe relative to the mannequin; and a processor, coupled to said means for providing position and orientation information, for acquiring image data representative of the internal organs of the living subject and for superimposing said surgical probe information with said image data to provide a composite image such that movement of the probe relative to the mannequin interior corresponds to movement of the probe in the living subject.

17. The simulator as claimed in claim 16 wherein said mannequin includes model organs disposed on the interior of the mannequin to replicate the anatomy of the mammalian subject.

18. The simulator as claimed in claim 16 wherein the means for providing position and orientation information comprises one or more light sources for producing a plurality of light beams in the interior of the mannequin so that said light beams form a gridlike pattern and one or more photodetectors adapted to detect said light beams and provide one or more photodetector signals responsive to the detected light beams, and means for determining which of the light beams have been intercepted by the probe based on said one or more photodetector signals.

\* \* \* \* \*